(12) United States Patent
Mellander et al.

(10) Patent No.: US 9,434,551 B2
(45) Date of Patent: Sep. 6, 2016

(54) SCREW CONVEYOR FOR LIGNOCELLULOSE-CONTAINING MATERIAL

(71) Applicant: Valmet AB, Sundsvall (SE)

(72) Inventors: Stefan Mellander, Alnö (SE); Peter Svedberg, Alnö (SE)

(73) Assignee: Valmet AB (SE)

( * ) Notice: Subject to any disclaimer, the term of this patent is extended or adjusted under 35 U.S.C. 154(b) by 0 days.

(21) Appl. No.: 14/766,877

(22) PCT Filed: Feb. 19, 2014

(86) PCT No.: PCT/SE2014/050199
§ 371 (c)(1),
(2) Date: Aug. 10, 2015

(87) PCT Pub. No.: WO2014/129958
PCT Pub. Date: Aug. 28, 2014

(65) Prior Publication Data
US 2015/0375942 A1     Dec. 31, 2015

(30) Foreign Application Priority Data

Feb. 22, 2013 (SE) ...................................... 1350215

(51) Int. Cl.
*B65G 33/14*     (2006.01)
*B30B 9/12*     (2006.01)
(Continued)

(52) U.S. Cl.
CPC ................. *B65G 33/14* (2013.01); *B30B 9/12* (2013.01); *B30B 9/127* (2013.01); *B65G 33/24* (2013.01); *B65G 33/265* (2013.01); *D21C 7/06* (2013.01); *D21C 9/18* (2013.01)

(58) Field of Classification Search
CPC .... B65G 11/206; B65G 33/14; B65G 33/22; B65G 33/24; B65G 33/265; B30B 9/12; B30B 9/127; D21C 7/06; D21C 9/18; C12M 21/04; C12M 33/16
USPC ......................................... 198/525, 548, 671
See application file for complete search history.

(56) References Cited

U.S. PATENT DOCUMENTS 837,010 A * 11/1906 Vernsten ................... B30B 9/12
                                                                      100/148
2,662,634 A * 12/1953 Tintes ..................... B65G 33/00
                                                                      198/550.1
(Continued)

FOREIGN PATENT DOCUMENTS

CA              1153287 A1     9/1983
GB              1100982 A      1/1968
(Continued)

OTHER PUBLICATIONS

International Search Report for Application No. PCT/SE2014/050199 dated May 21, 2014.

*Primary Examiner* — Leslie A Nicholson, III
*Assistant Examiner* — Keith R Campbell
(74) *Attorney, Agent, or Firm* — Lerner, David, Littenberg, Krumholz & Mentlik, LLP

(57) ABSTRACT

A screw conveyor for transporting lignocellulose-containing material, including a housing containing a screw for transporting the lignocellulose-containing material from the inlet to the outlet of the housing, the screw including a screw core disposed along the screw axis and a screw thread surrounding the screw core, the screw thread including a screw depth defined by the distance between the periphery of the screw and the screw core, the inlet including at least one transverse plate dividing the inlet into at least two axial compartments for evenly distributing the lignocellulose-containing material at the inlet. A method for transporting lignocellulose-containing material by the screw conveyor, in which the axial length of the screw inlet being equal to or greater than the screw depth times the quotient between the axial speed of the screw and the incoming speed of the lignocellulose-containing material at the inlet.

6 Claims, 2 Drawing Sheets

(51) Int. Cl.
*B65G 33/24* (2006.01)
*D21C 7/06* (2006.01)
*D21C 9/18* (2006.01)
*B65G 33/26* (2006.01)

(56) References Cited

U.S. PATENT DOCUMENTS

| | | | | |
|---|---|---|---|---|
| 3,312,329 | A * | 4/1967 | Hokana | A01K 5/0208 198/530 |
| 3,802,584 | A * | 4/1974 | Sackett, Sr. | B65G 19/16 198/535 |
| 5,205,695 | A * | 4/1993 | Katsui | F23G 5/444 222/129 |
| 6,217,710 | B1 | 4/2001 | Scherz et al. | |
| 7,195,084 | B2 * | 3/2007 | Burnett | B65G 53/10 175/206 |
| 2009/0022570 | A1 * | 1/2009 | Craig | C10J 3/30 414/197 |
| 2012/0126023 | A1 * | 5/2012 | Cantin | E01C 19/2045 239/1 |

FOREIGN PATENT DOCUMENTS

| | | | |
|---|---|---|---|
| GB | 1599092 A | 9/1981 | |
| JP | 2005138919 A | 6/2005 | |
| JP | WO 2012029862 A1 * | 3/2012 | ......... C21B 13/0053 |

* cited by examiner

SCREW CONVEYOR FOR LIGNOCELLULOSE-CONTAINING MATERIAL

CROSS-REFERENCE TO RELATED APPLICATIONS

The present application is a national phase entry under 35 U.S.C. §371 of International Application No. PCT/SE2014/050199 filed Feb. 19, 2014, published in English, which claims priority from Swedish Application No. 1350215-8 filed Feb. 22, 2013, all of which are hereby incorporated herein by reference.

FIELD OF THE INVENTION

This invention relates to a screw conveyor for lignocellulose-containing material.

BACKGROUND OF THE INVENTION

A screw conveyor is a device that uses a rotating helical screw blade, usually within a housing, to move material in several places in the cellulose industry, based on the principles of the Archimedean screw. It is also known as e.g. an auger conveyor, spiral conveyor or worm conveyor.

A screw feeder is very similar to a screw conveyor in its basic structure, but also compresses the material. The screw feeder comprises a conically shaped housing with a screw having a continuous screw thread for advancing the material through the housing while simultaneously compressing the material. Screw feeders of this kind are used in the cellulose industry in places where an air-tight material plug is desired for rendering it possible to feed the material against a high pressure (e.g. liquid column and gas pressure). Such screw feeders, thus, are often used for feeding lignocellulose containing material into an impregnation vessel or digester. The screw feeder may also dewater the material.

Today there is a problem that the screw conveyors and screw feeders are not operating completely filled. Historically, control of the screw has been made by controlling the rotational speed or the axial speed of the screw. The result is, however, in practise, that the screw will operate less filled the higher the rotational speed or axial speed is. Thus, the production capacity is not increased as wished by the increase in rotational speed or axial speed.

SUMMARY OF THE INVENTION

One object of the present invention is to provide an improved screw conveyor that solves the problems in the prior art.

This and other objects of the present invention have now been realized by the discovery of a screw conveyor for transporting lignocellulose-containing material comprising a housing, including and inlet and an outlet, and a screw for transporting the lignocellulose-containing material through the housing from the inlet to the outlet, the screw including a screw axis, a screw core disposed along the screw axis, a screw thread surrounding the screw core, and a screw periphery defined by the screw thread, the inlet having an axially length along the screw axis, the screw thread including a screw depth defined by the distance between the screw periphery and the screw core, the inlet including at least one transverse plate dividing the inlet into at least two axial compartments for evenly distributing the lignocellulose-containing material at the inlet. In a preferred embodiment, the inlet includes a vibrator. In another embodiment, the inlet includes a divergent portion of inlet adjacent to the screw for evenly distributing the lignocellulose-containing material at the inlet. Preferably, the at least one transverse plate includes an inclined edge.

In accordance with another embodiment of the screw conveyor of the present invention, the screw conveyor is a screw feeder, an auger conveyor, an auger feeder, a spiral conveyor, a worm conveyor, or a helix conveyor, the screw conveyor being based on the principles of Archimedes' screw.

The objects of the present invention can also be realized by the discovery of a method for feeding the lignocellulose-containing material with a screw conveyor which comprises a housing including an inlet and an outlet and a screw for transporting the lignocellulose-containing material through the housing from the inlet to the outlet, the screw including a screw axis, a screw core disposed along the screw axis, a screw thread surrounding the screw core including a screw periphery defined by the screw thread, the inlet having an axial length along the screw axis, the screw thread including a screw depth defined by the distance between the screw periphery and the screw core, the screw having an axial speed and the lignocellulose-containing material having an incoming speed at the inlet, the axial length of the screw inlet being equal to or greater than the screw depth times the quotient between the axial speed of the screw and the incoming speed of the lignocellulose-containing material at the inlet.

The advantages of the present invention are that an existing screw conveyor may be filled more by a simple change and that thus the production capacity of the screw conveyor may be increased. Thus, a smaller apparatus may be used than earlier to obtain the same production capacity, which makes it cheaper.

When the present invention is used in a screw feeder, since the screw feeder operates more filled, the degree of compaction will also be higher, which leads to a smaller risk that the material rotates with the screw, and also to an increased dewatering.

BRIEF DESCRIPTION OF THE DRAWINGS

The present invention, together with further objects and advantages thereof, may best be understood by reference to the following detailed description, and the appended drawings, in which.

DETAILED DESCRIPTION

Figure 1A:
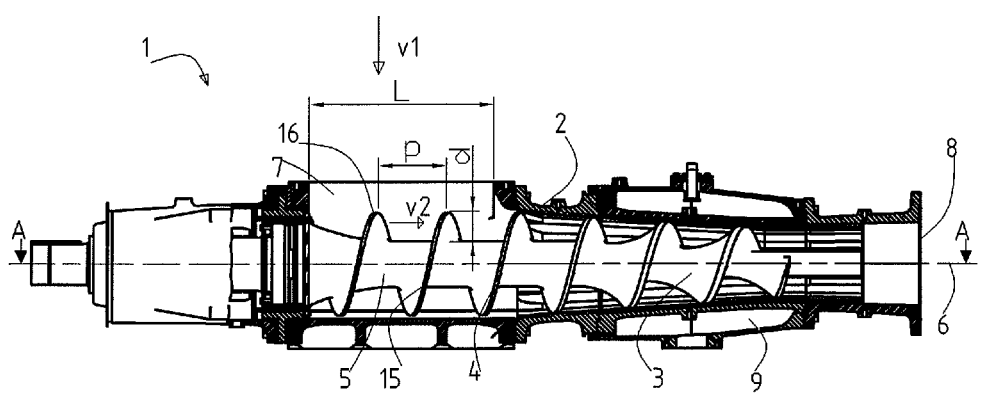
FIG. 1a is a side, cross-sectional view of a screw conveyor in the form of a screw feeder, according to a first embodiment of the present invention.

In the drawings, similar or corresponding elements are denoted by the same reference numbers.

Figure 1B:
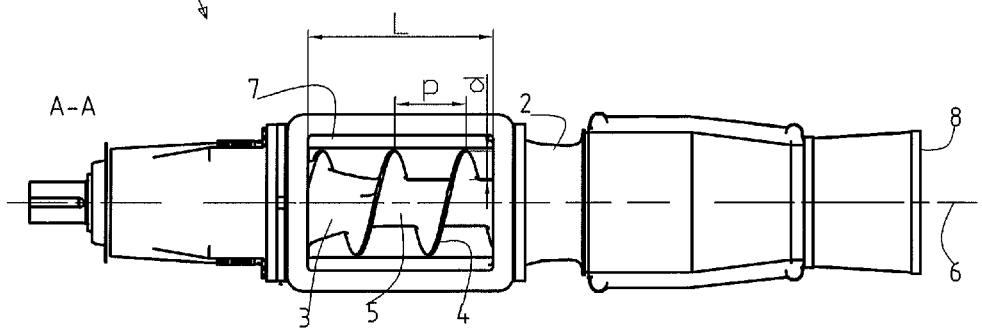
FIG. 1b is a top, cross-sectional view of the screw conveyor in the form of a screw feeder, according to a first embodiment of the present invention.

In FIG. 1 is shown a screw conveyor 1 in the form of a screw feeder 1, comprising a conical housing 2 and a screw 3, in the form of a feed screw 3, with a continuous screw thread 4, a screw core 5, flanks 15, a screw periphery 16 and an axis 6. The screw thread 4 has a pitch p (between the flanks 15) and a depth d (between the screw periphery 16 and the screw core 5). The screw 3 is driven by a motor and a gear box (not shown) at a rotational speed n and an axial speed $v_2$, which may be varied. The axial speed $v_2$ is defined as how fast a flank 15 of the screw thread 4 seems to move axially.

Figure 2A:
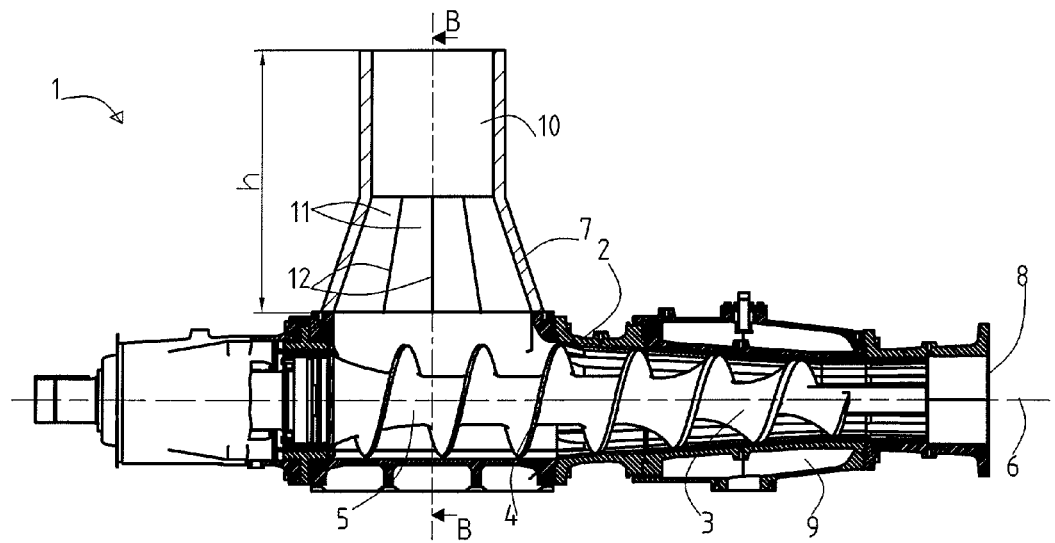
FIG. 2a is a side, cross-sectional view of a screw conveyor in the form of a screw feeder, according to a second embodiment of the invention.
Figure 2B:
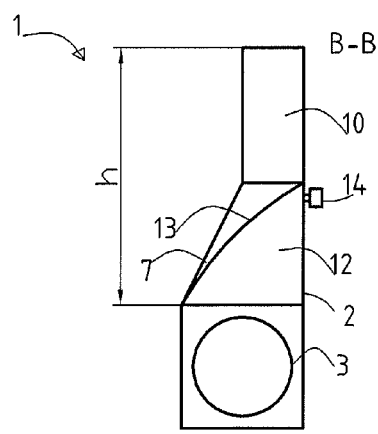
FIG. 2b is a front, cross-sectional view of the screw conveyor in the form of a screw feeder according to a second embodiment of the present invention.

Lignocellulose-containing material is supplied through an inlet 7, which has an axial length L along the axis 6 of the screw 3. The lignocellulose-containing material may e.g. come from a previous screw conveyor and reaches the inlet 7 at an incoming speed $v_1$. The lignocellulose-containing material may simply fall down through a chute 10 (schematically shown in FIGS. 2a and 2b) of a height h to the inlet 7 and reach the inlet 7 at a falling speed $v_F$.

The lignocellulose-containing material is then discharged in the form of a plug through an outlet 8, e.g. to a pressurised vessel, like a refiner or preheater. The lignocellulose-containing material may be dewatered by the compression and if the housing 2 has holes, then the liquid possibly pressed out by the compression may be collected in a liquid casing 9.

According to the present invention it has been realised that it doesn't matter if the rotational speed n or the axial speed $v_2$ is increased, because that will also decrease the time available to fill the screw. However, by changing other parameters, a higher rotational speed/axial speed may be used and the screw will still become filled, which will be explained in the following:

If the lignocellulose-containing material is considered as a continuum, then each point of the screw 3 should be exposed to the continuum for a certain time in order to fill that point of the screw 3 to the screw periphery 16 of the screw 3. The time that this point should be exposed is dependent on the axial speed $v_2$ of the screw 3, the incoming speed $v_1$ of the continuum at the inlet 7, the depth d of the screw 3, and the axial length L of the inlet 7.

According to the present invention, the following relationship has been realised in order for the screw to operate in a filled condition:

$$T_2 \geq T_1 \quad (1)$$

$$T_1 = d/v_1 \quad (2)$$

$$T_2 = L/v_2 \quad (3)$$

where d=the depth of the screw at the inlet, $v_1$=the speed of the incoming material at the inlet, L=the axial length of the inlet along the axis of the screw, $v_2$=the axial speed of the screw.

The axial speed $v_2$ of the screw may be calculated as:

$$v_2 = n \cdot p \quad (4)$$

where n=the rotational speed of the screw and p=the pitch of the screw.

If the lignocellulose-containing material falls freely, without too much air resistance, e.g. down a chute to the screw feeder, then the incoming speed of the lignocellulose containing material may be calculated as:

$$v_1 = v_F = \sqrt{2gh} \quad (5)$$

where g is the gravitational acceleration and h is the fall height of the chute.

Equation (1) may also be expressed as:

$$L/v_2 \geq d/v_1 \rightarrow L \geq d \cdot v_2/v_1 \quad (6)$$

This means that an existing screw feeder 1 may operate in a more filled condition by a simple change, i.e. by having a larger axial length L of the inlet 7. With a larger axial length L of the inlet 7 according to equation (6), it is thus possible to increase the rotational speed/axial speed of the screw 3 and still get a filled screw 3. Thus, the production capacity of the screw feeder 1 may be increased in a very simple way. A smaller screw feeder 1 may, hence, be used than in earlier applications and still obtain the same production capacity, which makes it cheaper.

Since the screw feeder 1 operates in a more filled condition, the degree of compaction will also be higher, which leads to a smaller risk that the material rotates with the screw, and also to an increased dewatering.

A risk with having a larger axial length L of the inlet 7 of the screw feeder 1, is that there will be a larger area onto which the incoming lignocellulose-containing material is to be distributed, and thus the lignocellulose-containing material might be distributed unevenly in the screw 3.

In FIG. 2 is shown an embodiment of this invention with a number of means 7, 11, 12, 13, and 14, which may be used independently of each other for distributing the lignocellulose-containing material more evenly. The inlet 7 is preferably diverging towards the screw 3 for improved distribution. In this context the last part of the chute 10, if any, may also be considered as part of the inlet 7.

Further, the inlet 7 is preferably divided into at least two axial compartments 11 by at least one transverse plate 12. The at least one transverse plate 12 may go almost all the way down to the screw 3 or there may be a larger gap to the screw 3. Preferably, the at least one transverse plate 12 only covers the inlet 7 partially, in order to decrease the risk that the lignocellulose-containing material will get stuck. For the same reason, the at least one transverse plate 12 also preferably has an edge 13 that is not horizontal, but oblique and inclined downwards.

Further, the inlet 7 preferably also comprises a vibrator 14 for even distribution of the lignocellulose-containing material.

Even though this description has only covered screw feeders, the invention is applicable also in other types of screw conveyors with or without compression and with or without dewatering. In this description, the term "screw conveyor" is used as a general concept covering all types of screw conveyors, screw feeders, auger conveyors, auger feeders, spiral conveyors, worm conveyors, helix conveyors or other arrangements building on the principle of Archimedes' screw.

Also in other aspects, the invention is of course not restricted to the shown embodiments, but may be varied within the scope of the claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A screw conveyor for transporting lignocellulose-containing material comprising
 a housing including an inlet and an outlet and a screw for transporting the lignocellulose-containing material through said housing from said inlet to said outlet, said screw including a screw axis, a screw core disposed along said screw axis, a screw thread surrounding said screw core, and a screw periphery defined by said screw thread, said inlet having an axial length along said screw axis, said screw thread including a screw depth defined by the distance between said screw periphery and said screw core, said inlet including at least one transverse plate dividing said inlet into at least two axial compartments for evenly distributing said lignocellulose-containing material into said screw.

2. The screw conveyor of claim 1, wherein said inlet includes a vibrator.

3. The screw conveyor of claim 1, wherein said inlet includes a divergent portion of said inlet adjacent to said screw for evenly distributing said lignocellulose-containing material into said screw.

4. The screw conveyor of claim 1, wherein said at least one transverse plate includes an inclined edge.

5. The screw of conveyor of claim 1, selected from the group consisting of a screw feeder, an auger conveyor, an auger feeder, a spiral conveyor, a worm conveyor, and a helix conveyor, the screw conveyor based upon the principles of Archimedes' screw.

6. A method for feeding lignocellulose-containing material with a screw conveyor which comprises providing a housing including an inlet and an outlet and transporting said lignocellulose-containing material through said housing from said inlet to said outlet by means of a screw including a screw axis, a screw core disposed along said screw axis, providing a screw thread surrounding said screw core including a screw periphery defined by said screw thread, said inlet having an axial length along said screw axis, said screw thread including a screw depth defined by the distance between said screw periphery and said screw core, operating said screw at an axial speed and providing said lignocellulose-containing material at an incoming speed at said inlet, said axial length of said screw inlet being equal to or greater than said screw depth times the quotient between said axial speed of said screw and said incoming speed of said lignocellulose-containing material at said inlet.

* * * * *